Jan. 26, 1960
H. F. JOHNSTONE
2,922,735
METHOD OF PRODUCING PULPING LIQUOR
Filed Dec. 18, 1956
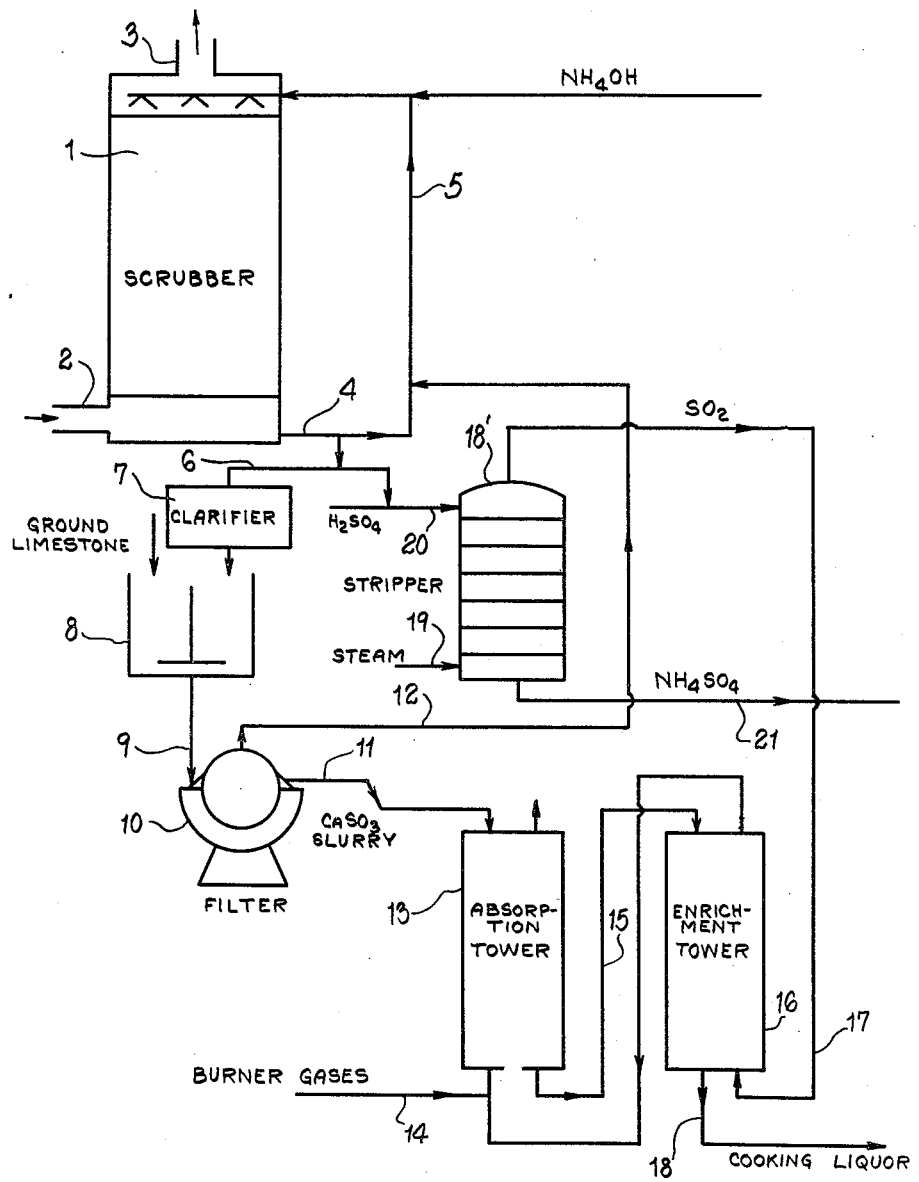
INVENTOR.
HENRY F. JOHNSTONE
BY
Kenyon & Kenyon
HIS ATTORNEYS

United States Patent Office 2,922,735
Patented Jan. 26, 1960

2,922,735
METHOD OF PRODUCING PULPING LIQUOR

Henry F. Johnstone, Urbana, Ill., assignor to Texas Gulf Sulphur Company, New York, N.Y., a corporation of Texas Application December 18, 1956, Serial No. 629,190

8 Claims. (Cl. 162—83)

This invention relates to the production of pulping liquor and particularly sulfite pulping liquor for use in producing paper pulp.

It is well known that flue gases from the combustion of coal contain significant quantities of sulfur dioxide. The utilization of this sulfur dioxide in the manufacture of sulfite pulp is complicated by the fact that large quantities of dust are present in the gases especially if coal is fired in the pulverized form. A part of the ash is soluble in water and this would contaminate any absorbing solution and must be eliminated before the dissolved sulfur dioxide can be utilized in making pulp.

One of the objects of this invention is to provide an improved method which can be utilized to recover sulfur dioxide from flue gases and use it in making pulping or cooking liquor. Another object is to provide such a method which can be carried out easily, simply and inexpensively. Other objects are to provide such a method which effectively removes impurities and which effectively utilizes raw materials and minimizes the production of excessive amounts of by-products.

The foregoing, as well as other objects, features and advantages of the invention, will be apparent from the following illustrative example of the practice of this invention which is described below in connection with the accompanying drawing, wherein the drawing is a flow sheet illustrating the preferred practice of this invention wherein the sulfur dioxide is recovered from flue gases and is made available as cooking or pulping liquor.

The flue gases are treated in an absorber or scrubber 1. They enter at the point 2 and pass through the exit 3 to the stack. In the absorber they are sprayed with an ammoniacal solution. In my Patent No. 2,676,090 I have described more in detail preferred techniques for scrubbing flue gases for the absorption of sulfur dioxide therefrom using an aqueous ammoniacal solution. I may utilize the procedure described in my Patent No. 2,676,090 for recovery of sulfur dioxide contained in waste gases, modified as hereinafter set forth to produce the pulping or cooking liquor. In carrying out the process the recovery of the sulfur dioxide is effective even when flue gases contain as little as .1 percent of sulfur dioxide, although usually larger quantities of sulfur dioxide will be present in the flue gases.

The effluent from the absorber is drawn off at 4. Some is recirculated as indicated at 5 and the remainder is divided into two portions.

The effluent includes ammonium salts, particularly the sulfite and bisulfite of ammonia which are hereinafter referred to generally as ammonium sulfite, and ammonium sulfate.

One portion of the effluent from the absorber is led, as indicated at 6, to a clarifier 7 where the insoluble ash and suspended dust particles are settled out. The clarified portion of the effluent is then led to a mixer 8 where it is mixed with lime or ground limestone to produce calcium sulfite which is insoluble. The slurry from the mixer is led, as indicated at 9, to a rotary filter 10 which separates out and washes the solid calcium sulfite. The filtrate is passed, as indicated at 12, back to the absorber system.

The solids from which the filtrate has been separated pass as a slurry, as indicated at 11, to an absorption tower 13 where the calcium sulfite is converted to cooking liquor by absorption of sulfur dioxide from a suitable source such as burner gases from burning brimstone or pyrites. The cooking liquor passes, as indicated at 15, from the absorption tower to an enrichment tower 16 where additional sulfur dioxide is introduced, as indicated at 17. This sulfur dioxide comes from other steps in the process which are to be described hereinafter. The cooking liquor is drawn off at 18.

A second portion of the effluent is led from the absorber to a stripper 18' wherein sulfur dioxide is stripped from this portion of the effluent. This is accomplished by heating with steam introduced as indicated at 19 and may also be accomplished by the use of sulfuric acid which is introduced, as indicated at 20, to convert the ammonium sulfite to ammonium sulfate thus freeing the sulfur dioxide which is stripped in the stripper. The ammonium sulfate is drawn off, as indicated at 21, where it may be recovered for use as fertilizer.

By way of typically exemplifying the practice of this invention, the stream entering the absorber 1 in which sulfur dioxide is absorbed from waste gases contains 10 moles of ammonium ions ($NH_4^+$), 2 moles of sulfite ions ($SO_3^=$), 5 moles of bisulfite ions ($HSO_3^-$) and 0.5 mole of sulfate ions ($SO_4^=$) per 100 moles of water and has very low equilibrium pressures of both sulfur dioxide and ammonia. The stream leaving the absorber through the line 4 contains 10 moles of ammonium ions, 0.9 mole of sulfite ions, 7 moles of bisulfite ions, and 0.6 mole of sulfate ions per 100 moles of water. The equilibrium vapor pressure of sulfur dioxide is slightly higher than that in the entering stream, and the equilibrium vapor pressure of ammonia is lower. The increase in the concentration of sulfate in solution is caused partly by oxidation of ammonium sulfites, partly by absorption of sulfur trioxide from the gases, and partly by dissolution of soluble sulfates in the ash. This stream also contains suspended dust particles collected from the gas in the absorber.

A minor proportion, approximately 10%, of the solution taken from the absorber, and preferably after suspended dust particles have been permitted to settle out, is treated to release sulfur dioxide therefrom. This is done by mixing therewith sufficient sulfuric acid to react with all of the dissolved ammonium sulfite and bisulfite, i.e., approximately 4.4 moles of sulfuric acid per 100 moles of water. The reaction with the sulfuric acid results in the formation of ammonium sulfate and sulfur dioxide, and the stripping of the sulfur dioxide from the resulting solution is promoted by the use of steam which is passed through the stripper 18' wherein the solution is intimately contacted with the steam as by passing the solution down through a packed column countercurrent to the rising steam. The resulting mixture of sulfur dioxide and steam is then passed through a condenser to condense the steam and separate from the resulting water and sulfur dioxide which is recovered for use in enriching the cooking liquor.

The main portion, approximately 90%, of the solution taken from the absorber, is passed to the clarifier 7 wherein there is a settling out from the solution of suspended dust particles. The thus clarified solution is then commingled with ground limestone or lime in the mixer 8 in the ratio of 1 mole of lime (CaO) to 1 mole of sulfite plus bisulfite contained in the solution with resultant reaction and formation of a slurry containing calcium sulfite ($CaSO_3$) as an insoluble precipitate.

The slurry containing calcium sulfite precipitate is subjected to filtration in the filter 10 to filter out the calcium sulfite and the filter cake is washed with water to remove soluble impurities. After washing, water is added to the filter cake to form a suspension containing about 1000 to 1550 grains of solid calcium sulfite per gallon, and the slurry is taken to the absorption tower 13 for absorption of sulfur dioxide contained in gases from a sulfur burner. The stream from the absorption tower contains about 1% of combined sulfur dioxide and about 2% of free sulfur dioxide. The "combined sulfur dioxide" is that which is equivalent to the calcium present and the amount of sulfur dioxide absorbed by the solution in excess of the combined sulfur dioxide is "free sulfur dioxide." Whereas the calcium sulfite occurred in substantially insoluble condition in the slurry entering the absorption tower, it becomes increasingly soluble as the concentration of absorbed sulfur dioxide increases and becomes dissolved in the stream leaving the absorption tower. In the absorption tower the burner gases are brought into intimate contact with the calcium sulfite slurry. This may be done in any suitable way, preferably by causing the slurry to flow downward in intimate countercurrent contact with a rising stream of the burner gases containing sulfur dioxide. Many suitable tower constructions for this purpose are well known, such as those wherein the liquid descends from one tray to a next lower one countercurrent to gas moving upwardly that is directed so as to successively bubble through the liquid in the trays. The Barker apparatus illustrated and described in "Chemistry of Pulp and Paper Making" by Sutermeister, Wiley, New York, 3rd ed. (1941), pp. 179–80, is suitable.

The solution from the absorption tower is further enriched as regards its content of free sulfur dioxide in the enrichment tower 16 to the extent desired for cooking liquor, e.g. about 5%. This is accomplished by contacting the solution with the sulfur dioxide in substantially pure form that has been recovered from the scrubber effluent as above described. The contact may be accomplished by counterflow of the descending solution with rising sulfur dioxide similarly to the contact effected in the absorption tower except that in the enrichment tower substantially pure sulfur dioxide is employed for increasing the content of free sulfur dioxide in solution. Any sulfur dioxide not absorbed in the enrichment tower is commingled with the burner gases entering the absorption tower wherein more complete removal of sulfur dioxide from the gases is effected.

In carrying out the above described process which is illustrated in the example given, high recovery of sulfur dioxide from flue gases is effected. The process is simple and inexpensive and utilizes otherwise waste sulfur dioxide, with the result that the provision of sulfur dioxide from a source such as burning sulfur or such as pure sulfur dioxide shipped to the plant may be greatly reduced or eliminated altogether as well as the shipping problems involved in getting the sulfur or sulfur dioxide to the pulp mill.

By the process disclosed, the effluent from scrubbing flue gases with ammoniacal solution is effectively utilized. Previous proposals for utilizing such solutions have involved acidification of all of the solution obtained with sulfuric acid utilizing the procedure of the sulfur dioxide recovery step described hereinabove. But when all of the sulfur dioxide is recovered in this way there is an accompanying production of an amount of ammonium sulfate which often is in excess of what would be preferable in a commercial operation. Moreover, in order to provide more sulfuric acid for use in the process from the sulfur dioxide initially recovered about two-thirds of it goes back into the operation and this requires additional expense both for processing and for the sulfuric acid plant installation and maintenance that are required. In addition, all of the ammonia used in the solution for scrubbing the flue gases becomes converted to ammonium sulfite and this means not only the production of large quantities of the ammonium sulfate by-product but also the supply of fresh ammonia in large amounts. In my aforesaid Patent No. 2,676,090 I have disclosed certain improvements for minimizing these drawbacks, but they involve stripping the sulfur dioxide from the solution under special conditions, as distinguished from the improvements disclosed herein.

By the operation disclosed according to the present invention only a minor part of the absorber effluent is treated with sulfuric acid to produce sulfur dioxide and ammonium sulfate and the sulfur dioxide values in the major part of the scrubber effluent are recovered without stripping of any kind, namely, by reaction of ammonium sulfite with lime with resultant production of insoluble calcium sulfite and accompanying regeneration of the ammonia solution used in scrubbing the flue gases. This greatly reduces the amount of fresh ammonia that has to be fed into the system. Moreover, the fact that the reaction at this stage results in the formation of insoluble calcium sulfite not only enables the ammonia solution to be separated and reused, but also enables the separation to be carried out very effectively as regards both the lime and the sulfite values. The sulfite at this stage being contained in a compound which is insoluble, also permits removal from the residue from the filtration of any soluble impurities taken up from the flue gases in the absorber. This may be accomplished preferably by washing the filter cake with water while it remains on the filter, but it may also be occasioned by dispersing the calcium sulfite in water and filtering it again before it is converted to cooking liquor. Since the insoluble impurities already have been caused to become settled out from the scrubbing solution as initially produced, an effective purification is effected as regards both insoluble and soluble impurities.

For the production of the cooking liquor, the clarification of the major portion of the absorber effluent that is mixed with the limestone is particularly important, but insofar as the recovery of sulfur dioxide is concerned from the minor portion of the absorber effluent, the removal of solid impurities does not materially affect the use of the recovered sulfur dioxide in enriching the cooking liquor. However, the removal of the insoluble impurities is highly desirable in improving the purity of the ammonium sulfate recovered as a by-product. If desired, a common clarifier may be employed for separating out solid impurities from both portions of the scrubber effluent.

While reference has been made to the use of lime for reaction with ammonium sulfite to produce calcium sulfite, any other calcium compound that will react with the acidic solution such as limestone may be utilized for providing the calcium for the reaction. However, when the filtrate is returned to the scrubbing system it is desirable to use a compound such as limestone, calcium oxide or calcium hydroxide, which are referred to herein and in the claims as lime. In order to obtain efficient separation of the calcium sulfite it is desirable that the amount of lime mixed with the ammonium sulfite solution be approximately the molar equivalent of the sulfite, i.e., ammonium sulfite plus bisulfite, in the scrubber effluent. It is important to utilize a calcium compound rather than a compound of magnesium, for example, for magnesium sulfite is considerably more soluble than calcium. Accordingly, it is important to use a material such as limestone as distinguished from a material such as dolomite which contains a large proportion of magnesium carbonate as well as calcium carbonate.

Advantage having been taken of the occurrence of calcium sulfite in insoluble state both to effectively recover the ammonia solution and to permit washing out of soluble impurities, the calcium sulfite slurry thereafter may be treated to become enriched with sulfur dioxide with resultant increase in the solubility of the calcium sulfite. This is accomplished initially by burner gases, i.e., gases containing $SO_2$ diluted with other gas as, for example, when sulfur, or material containing substantial sulfur, is burned in air. Very effective ultimate enrichment is made possible by utilizing the substantially pure sulfur dioxide which is conveniently produced simultaneously from a minor part of the absorber solution initially produced.

The enrichment may be carried out to whatever extent is regarded as desirable for a particular pulping operation. The term "cooking liquor" as used herein and in the claims refers to any liquor produced according to this invention which contains sufficient free sulfur dioxide to have utility in a pulping operation. During the enrichment step wherein the calcium sulfite becomes soluble it is believed that the calcium sulfite comprises calcium bisulfite.

In the manner described, the disadvantages due to impurities which result from attempting to directly contact lime solution with flue gases in making a cooking liquor are avoided. Moreover, by use of the steps disclosed a common scrubbing solution is utilized for obtaining both the calcium sulfite base and the sulfur dioxide whereby ultimate enrichment of the base is effected. The steps used also provide economical steps for effecting purification and permit a regeneration of the main part of the scrubbing solution, thus effecting economies in fresh ammonia requirements. The other raw material requirements also are reduced and the sulfur dioxide is recovered in the desired useful product, i.e., cooking liquor, with minimum waste or production of excessive quantities of by-products.

It will be understood that the above preferred form of the invention is merely illustrative, and that the invention may be employed in other forms, and it is not intended to limit the invention to the specific illustrative form described, but it is intended only to limit the invention to that covered in the claims.

This application is a continuation-in-part of my application Ser. No. 339,631, filed March 2, 1953, and now abandoned.

I claim:

1. A process of producing sulfite cooking liquor for a pulping operation comprising removing sulfur dioxide from flue gas by scrubbing flue gas with an aqueous ammoniacal solution, separating the scrubber effluent into a first portion and a second portion, removing insoluble impurities from said first and second portions, converting the ammonium sulfite in said first portion to solid calcium sulfite precipitate by reaction with calcium compound selected from the group consisting of calcium oxide, calcium hydroxide and calcium carbonate introduced therein, filtering the solid calcium sulfite precipitate from the remaining ammoniacal solution, returning the filtrate to flue gas scrubbing solution, removing water soluble impurities from the retained calcium sulfite precipitate by washing the precipitate with water, thereafter dispersing the calcium sulfite in water to form an aqueous slurry, converting the slurry to cooking liquor by contact with gas containing sulfur dioxide, adding sulfuric acid to said second portion of said scrubber effluent to convert ammonium sulfite contained therein to ammonium sulfate and sulfur dioxide, stripping sulfur dioxide from the solution by passing steam through said solution in contact therewith, recovering ammonium sulfate from the residual solution, recovering the sulfur dioxide from the mixture of steam and sulfur dioxide by condensing the steam and removal of the condensate, and including the recovered sulfur dioxide in said gas used in converting said slurry to cooking liquor.

2. A method according to claim 1 wherein sulfur dioxide-containing gas comprising sulfur dioxide diluted with other gas is used in an initial phase of converting said slurry to cooking liquor, the final phase of enrichment respecting free sulfur dioxide content utilizing substantially pure sulfur dioxide recovered from said second portion of the scrubber effluent.

3. A process of producing sulfite cooking liquor for a pulping operation comprising removing sulfur dioxide from flue gas by scrubbing flue gas with an aqueous ammoniacal solution, separating the scrubber effluent into a first portion and a second portion, removing insoluble impurities from said first portion, converting the ammonium sulfite in said first portion to solid calcium sulfite precipitate by reaction with calcium compound selected from the group consisting of calcium oxide, calcium hydroxide and calcium carbonate introduced therein, filtering the solid calcium sulfite precipitate from the remaining ammoniacal solution, returning the filtrate to flue gas scrubbing solution, removing water soluble impurities from the retained calcium sulfite precipitate by washing the precipitate with water, thereafter dispersing the calcium sulfite in water to form a slurry, converting the slurry to cooking liquor by contacting it with sulfur dioxide-containing gas, recovering sulfur dioxide from said second portion of said scrubber effluent, and including the recovered sulfur dioxide in said sulfur dioxide-containing gas used in converting said slurry to cooking liquor.

4. A process for producing sulfite cooking liquor for a pulping operation which comprises removing sulfur dioxide from flue gas by scrubbing flue gas with an aqueous ammoniacal solution, separating the scrubber effluent into a first portion and a second portion, converting the ammonium sulfite in said first portion of said scrubber effluent to solid calcium sulfite precipitate by mixing said first portion with calcium compound selected from the group consisting of calcium oxide, calcium hydroxide and calcium carbonate, filtering the solid calcium sulfite precipitate from the remaining ammoniacal solution, returning the filtrate to flue gas scrubbing solution, dispersing the calcium sulfite in water to form a slurry, converting said slurry to cooking liquor by contacting it with sulfur dioxide-containing gas, recovering sulfur dioxide from said second portion of said scrubber effluent and including the recovered sulfur dioxide in said sulfur dioxide-containing gas used in converting said slurry to cooking liquor.

5. A process according to claim 4 wherein the amount of calcium compound mixed with said first portion of said scrubber effluent is approximately the molar equivalent of the sulfite content of said first portion including both normal sulfite and bisulfite.

6. A process for producing cooking liquor for a pulping operation which comprises removing sulfur dioxide from flue gas by scrubbing flue gas with an aqueous ammoniacal solution, separating the scrubber effluent into a first portion and a second portion, converting the ammonium sulfite to calcium sulfite by reaction with a calcium compound, dispersing the calcium sulfite in water as a slurry, converting the slurry to cooking liquor by contacting it with sulfur dioxide-containing gas, recovering sulfur dioxide from said second portion of said scrubber effluent, and including the recovered sulfur dioxide in said sulfur dioxide-containing gas used in converting said slurry to cooking liquor.

7. A method according to claim 6 wherein substantially pure sulfur dioxide is recovered from said second portion of said scrubber effluent and said sulfur dioxide in said substantially pure state is contacted with said slurry to effect at least the final enrichment of said slurry by absorption of sulfur dioxide therein.

8. A process of producing cooking liquor which comprises removing sulfur dioxide from flue gas by scrubbing the flue gas with an aqueous ammoniacal solution to produce a solution containing ammonium sulfite, separating solid impurities from the scrubber effluent to produce clarified solution, converting ammonium sulfite in said solution after clarification to solid calcium sulfite precipitate by reaction with calcium compound selected from the group consisting of calcium oxide, calcium hydroxide and calcium carbonate, filtering said calcium sulfite precipitate from the solution, removing water soluble impurities from the solid calcium sulfite precipitate residue of the filtration by washing with water, thereafter dispersing said calcium sulfite residue in water in the form of a slurry, and converting said slurry to cooking liquor by contacting it with sulfur dioxide-containing gas.

References Cited in the file of this patent

UNITED STATES PATENTS

| | | |
|---|---|---|
| 1,458,309 | Richter | June 12, 1923 |
| 2,161,056 | Johnstone | June 6, 1939 |
| 2,545,389 | Somer et al. | Mar. 13, 1951 |
| 2,676,090 | Johnstone | Apr. 20, 1954 |
| 2,696,424 | Schoeffel | Dec. 7, 1954 |